United States Patent
Takla et al.

(10) Patent No.: US 11,743,690 B2
(45) Date of Patent: Aug. 29, 2023

(54) PUBLISH AND SUBSCRIBE COMMUNICATION SYSTEM

(71) Applicant: Verizon Patent and Licensing Inc., Basking Ridge, NJ (US)

(72) Inventors: Mourad B. Takla, Hillsborough, NJ (US); Xiong Yang, Berkeley Heights, NJ (US); Chokri Trabelsi, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 172 days.

(21) Appl. No.: 17/238,724

(22) Filed: Apr. 23, 2021

(65) Prior Publication Data

US 2022/0345852 A1    Oct. 27, 2022

(51) Int. Cl.
| | |
|---|---|
| *H04W 4/00* | (2018.01) |
| *H04W 4/06* | (2009.01) |
| *H04W 4/20* | (2018.01) |
| *H04W 4/50* | (2018.01) |
| *H04W 8/18* | (2009.01) |
| *H04L 67/53* | (2022.01) |
| *H04L 67/55* | (2022.01) |
| *H04L 67/562* | (2022.01) |

(52) U.S. Cl.
CPC .............. *H04W 4/06* (2013.01); *H04L 67/53* (2022.05); *H04L 67/55* (2022.05); *H04L 67/562* (2022.05); *H04W 4/20* (2013.01); *H04W 4/50* (2018.02); *H04W 8/186* (2013.01)

(58) Field of Classification Search
CPC .......... H04W 4/06; H04W 4/50; H04W 4/20; H04W 8/186; H04L 67/53; H04L 67/55; H04L 67/562
See application file for complete search history.

(56) References Cited

U.S. PATENT DOCUMENTS

| | | | | |
|---|---|---|---|---|
| 2008/0227438 | A1* | 9/2008 | Fletcher ................ | H04M 3/567 455/416 |
| 2009/0215469 | A1* | 8/2009 | Fisher ................... | H04L 67/306 455/456.3 |
| 2010/0287006 | A1* | 11/2010 | Cannon .................. | G06Q 10/06 455/414.1 |
| 2016/0080921 | A1* | 3/2016 | Yadav ................... | H04W 4/023 455/456.2 |

* cited by examiner

*Primary Examiner* — Khai M Nguyen (57) ABSTRACT

One or more computing devices, systems, and/or methods for implementing a publish and subscribe communication system are provided. A topic identifier comprising publisher and subscriber information and a topic data type of a topic may be generated. The topic identifier and communication address information associated with the topic may be maintained at an external broker. The communication information may be provided from the external broker to a requestor in response to an inquiry regarding the topic identifier. Access to data published to the topic may be provided such that a publisher of the topic directly transfers data of the topic to a subscriber of the topic.

20 Claims, 9 Drawing Sheets

PUBLISH AND SUBSCRIBE COMMUNICATION SYSTEM

BACKGROUND

A wireless communication system may implement a broadcast mechanism for data exchange. Various types of traffic of the wireless communication system may flow through transport and publisher-subscriber layers. In an example, real time data traffic, such as data of a protocol data unit (PDU), may be processed through the wireless communication system in microsecond speed such as within a single transmit time interval. In another example, fast data, such as user equipment (UE) radio frequency (RF) data, which changes less frequently than a radio frame of 10 ms but more frequently than every second may be processed through the wireless communication system. In another example, low priority data that changes less frequently than the fast data, such as communication data used to obtain configuration information or an IP address of a port, may be processed through the wireless communication system. Each of these different types of data are dealt with independently and/or are given their own priority.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

One or more systems and/or techniques for implementing a publish and subscribe communication system are provided. This publish and subscribe communication system implements an external broker that is designed to track topics to which data is published by publishers and subscribed to by subscribers. The external broker is designed to track the locations of topics, subscribers, and/or publishers, such as IP address information, port information, etc. This provides the ability for different components (e.g., services, nodes, user equipment, digital units, radio access network intelligent controllers, cellular communication equipment, etc.), such as publisher components and subscriber components, to communicate with one another without the components being burdened with having to track where to obtain data and/or how to obtain the data. Also, publishers are not burdened with having to track how many subscribes are requesting data of a topic being published to by the publisher. As part of the publish and subscribe communication system, components can take on the role of a topic creator that creates a topic, a publisher that publishes data to the topic, and/or a subscriber that subscribes to receive data published to the topic.

Components can reside on the same computing device or on different computing devices. If a subscriber and a publisher are on a same computing device, then the topic may be a local topic between the subscriber and the publisher. If a subscriber and a publisher are on different computing devices, then the topic may be an external topic between the subscriber and the publisher. As provided herein, a publisher is designed to directly transmit data, being published to a topic, to subscribers of the topic regardless of whether the topic is a local topic or an external topic. That is, the data is not being transmitting from the publisher to another entity/component that then transmits the data to the subscribers. Instead, the publisher directly transmits the data to the subscriber, such as according to a point to point communication scheme. Because the publisher is directly transmitting the data to the subscriber, high speed transactions and data exchange can be provided because there is no additional latency otherwise experienced if the publisher was transmitting the data to another entity/component that would then route that data to the subscriber. For example, in a 5G wireless simulation system all data is sent over Ethernet. To eliminate data broadcast at high speed in a large transport network, the publisher sends data directly to a list of subscribers. In an example, the data rate required from data generation to data reception is less than 125 μsec for the case of 5G over the air slot format μ=3. With such a stringent requirement in this example, the budget allowed for data transmission over the transport network is around 20 p sec to allow data processing. Due to this high speed data exchange, the publisher will send the data directly to the subscriber.

As part of implementing the publish and subscribe communication system for processing real time data, a real time broker (an external broker) is designed to track and share whether topics are available or not. The real time broker is designed to provide mappings between topics and IP addresses of the topics and/or subscribers and IP addresses of the subscribers. The real time broker may maintain a list of available topics and/or a subscriber list of subscribers of topics. The real time broker is designed to create a topic identifier to ease routing of traffic between different components. A real time publisher is designed to create one or more topics, notify the real time broker of the topics that the real time publisher creates and maintains a list of subscribers to each topic (e.g., a local list of local subscribers and an external list of external subscribers remote to a computing device hosting the real time publisher), and/or transmit data of a topic directly to subscribers of the topic. A real time subscriber is designed to request, from the real time broker, to subscribe to a topic or set of topics, receive data directly from a real time publisher, and/or unsubscribe from a topic if the real time subscriber is no longer to receive data published to the topic.

In some embodiments, the publish and subscribe communication system is designed for processing fast data. In some embodiments, the fast data may correspond to data that changes less frequently than a radio frame of 10 ms but more frequently than every second, such as user equipment (UE) radio frequency (RF) data. In some embodiments, the rate of the fast data may be between 10 ms and 1 second. In this way, the publish and subscribe communication system can be configured for processing a variety of different types of data, such as real time data, fast data, low priority data, etc.

In some embodiments, the publish and subscribe communication system is implemented for a wired network. The publish and subscribe communication system is designed to provide direct point to point communication, such as where a specific publisher implements a dedicated topic where that specific publisher directly transmits data of the topic to a specific subscriber. With the dedicated topic, the publisher tracks an identifier of the subscriber. A component that created the dedicated topic is responsible for deleting the dedicated topic once the dedicated topic is no longer needed.

The publish and subscribe communication system is designed to provide point to multipoint communication (broadcast), such as where the publisher implements a general subscription topic. In an example of the general subscription topic, a publisher may create the general subscription topic in order to share data with more than one subscriber. A topic identifier may be dynamically defined (e.g., on an as needed basis) to identify a specific publisher and subscriber, and thus is used to facilitate communication in a dynamic manner. A subscriber identifier within the topic identifier for the general subscription topic may be set to a particular value (e.g., all 1s or any other value) to indicate that any subscriber can connect to the general subscription topic. The subscribers can use a publisher name of the publisher and topic type in order to read data published to the general subscription topic. This can result in the publisher sending data directly to multiple subscribers, which can change depending on the situation such as what current components are subscribing at a particular point in time to the general subscription topic. The publisher may create a topic identifier for the general subscription topic, and may send the topic identifier along with an announcement of creating a new general subscription topic to an external broker. Other components may learn about the general subscription topic through the external broker, and can submit requests to subscribe as subscribers to the general subscription topic. These subscribers will receive data directly from the publisher. A subscriber is responsible to delete a subscription request from for the general subscription topic once the subscriber is no longer to receive data published by the publisher through the general subscription topic (e.g., when user equipment is performing a handoff and no longer requests data from a given digital unit).

The publish and subscribe communication system is designed to provide multipoint to point communication, such as where a general publish topic is implemented. In an example, a subscriber can create the general publish topic in order to receive data from multiple publishers (sources). Any publisher may connect to the general publish topic, such as by using a topic name and subscriber type in order to publisher data to the general publish topic. With the general publish topic, a component creates the general publish topic, which can be the same or different than the subscriber and/or publishers for the general publish topic. The component sends a topic identifier to the external broker to announce an IP address of the general publish topic. In this instance, the publisher name is set to a value indicating that any publisher can publish to the general publish topic (e.g., all 1s or any other value). If another component wants to publish to the general publish topic as a publisher, the component queries the external broker for the topic in order to obtain the IP address of the general publish topic. The component, as the publisher, sends data directly to the subscriber of the general publish topic (e.g., the creator of the general publish topic). The creator of the general publish topic and/or other components can subscribe to the general publish topic as needed. In an example, the general publish topic may be hosted at the creator's server.

In some embodiments, the publish and subscribe communication system is implemented for a wired network. In some embodiments, the publish and subscribe communication system is implemented through the wired network in order to simulate/emulate a wireless network, such as a computer implemented simulation of communication between components of a cellular network, such as user equipment (UE), RAN intelligent controllers, gNodeBs, gNodeGs, etc. With a wireless network, information is broadcast and available to any listener. When trying to simulate/emulate this type of communication within a wired environment, the amount of traffic would be excessive and there would not be enough bandwidth to support such communication. This would be even more problematic if user equipment (e.g., a phone or other device with communication capabilities) is allowed to transition between different base stations (e.g., move between different gNodeBs or gNodeGs) with visibility to other components within the wireless network during a simulation. One alternative could be to hardcode all component locations (e.g., communication locations, such as IP addresses), but this would be very restrictive with a burdensome amount of upfront manual configuration. Accordingly, the publish and subscribe communication system, provided herein, is capable of simulating/emulating the wireless network through a wired network because publishers can directly transmit data of topics to subscribers. Publishers can directly transmit the data to subscribers without having to have prior knowledge of and/or track IP addresses of all of the components since an external broker can handle such on an as need basis such as when a topic is created or a topic is subscribed to by a subscriber. This is achieved by using an identifier of the publisher, an identifier of the subscriber, and a data type to locate a correct relationship between the publisher and subscriber without prior definition of the topic ID. This allows a UE moving from one area to the other of dynamically creating the proper topics it should use to communicate to the DU by only knowing the ID of the DU.

Figure 1:
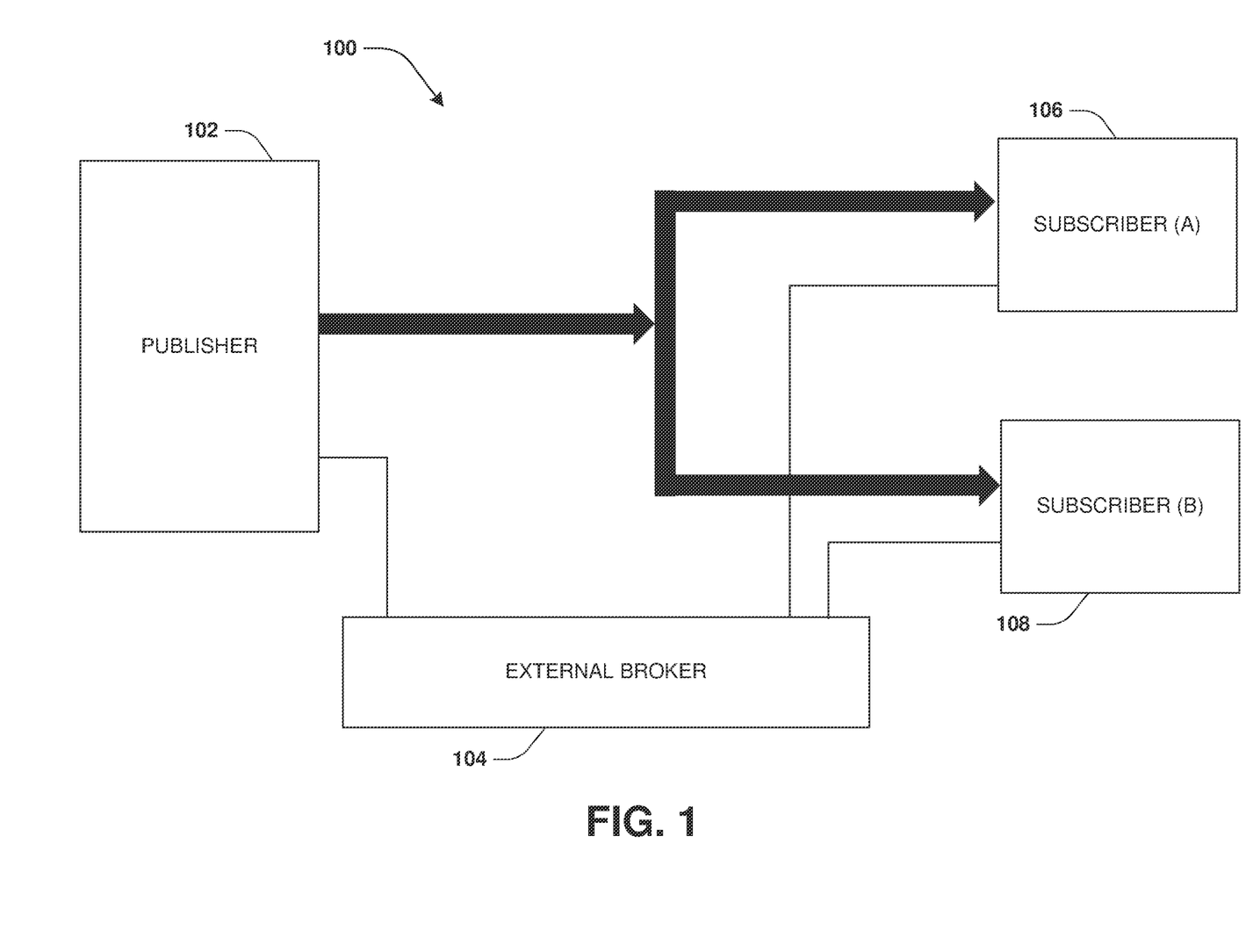
FIG. 1 is a diagram illustrating an example scenario associated with a publish and subscribe communication system.

FIG. 1 illustrates an example of a publish and subscribe communication system 100. In some embodiments, the publish and subscribe communication system 100 may be implemented to provide point to point, multipoint to point, and/or point to multipoint communication between components (e.g. services, processes, software modules, stacks, user equipment, base stations, RAN intelligent controllers, communication devices, or simulation of such components where a wireless network is being simulated) of a network such as a wired network or any other type of network. A component may assume one or more roles, such as a topic creator role for creating topics, a data publisher role for publishing data to topics, and/or a topic subscriber role for subscribing to topics in order to receive data directly from publishers of the topics.

A component having the topic creator role is a topic creator. The topic creator creates a topic whether topic creator is going to publish data using the topic or receive data by subscribing through the topic. In some embodiments, the topic creator is a publisher. In some embodiments, the topic creator may need to receive data from different sources, and thus the topic creator creates the topic and subscribes to the topic as a subscriber. Other components may become aware of the topic, and then publish data to the topic. In this example, the topic resides on a server of the topic creator, and the data will be processed locally by the topic creator.

A component having the data publisher role is a publisher, such as publisher 102. The publisher 102 will publish data to a topic. In some embodiments, there is a single publisher for a topic. In some embodiments, there are multiple publishers for a topic, and thus a publisher identifier within a topic identifier for this type of topic comprises a value indicating that any component can publish to the topic (e.g., all 1s or any other value). A component having the topic subscriber role may be a subscriber, such as subscriber (A) 106 and subscriber (B) 108. The subscriber subscribes to a topic in order to receive data published to the topic. In some embodiments, there can be multiple subscribers to a topic. It may be a publisher's responsibility to ensure delivery of data to each subscriber in a point-to-point fashion where data is directly transmitted from the publisher (a source point) to a subscriber (a destination point) without any intervening hops. In some embodiments, point-to-point communication is implemented instead of multicast communication in order to reduce traffic that would otherwise have to be sent to every component and/or server hosting components (e.g., many servers may not host subscribers to a particular topic, and it would waste bandwidth and resources to transmit data being published to the topic to those servers).

A component may be associated with communication address information, such as an IP address (though other identifiers may be used) and/or one or more ports, such as a user datagram protocol (UDP) port. An IP address and port number may be included within a packet header used to communicate between different components. Each component may have one or more communication end points in order to enable other components to communication with it, such as through a simulation environment being used to simulate the wireless network through the wired network for which the publish and subscribe communication system 100 is implemented. A component, such as a radio access network component (RAN), a user equipment component, a RAN stack, and a user equipment stack may be terminated with a communication end point corresponding to an IP address. A service component may be terminated with a communication end point corresponding to a UDP port.

In an example, an external broker 104 is implemented. The external broker 104 is designed to track topics to which data is published by publishers and subscribed to by subscribers. The external broker 104 is designed to track the topics, subscribers, and/or publishers, using identifying information such as IP address information, port information, etc. In an example, the external broker 104 may track the subscribers for debugging and validation purposes. This provides the ability to track various relational activities of a simulator performing a simulation using the publish and subscribe communication system 100, such as insight into what subscribers are receiving what data. This is accomplished by the external broker 104 at a centralized point, which does not have to process such data in real-time. Even though the external broker 104 tracks this information, data is being transmitted directly from the publisher 102 to the subscriber (A) 106 and/or the subscriber (B) 108 using point-to-point communication and is not routed through the external broker 104. This enables fast point-to-point communication so that wireless communication can be simulated/emulated by the publish and subscribe communication system 100.

Figure 2:
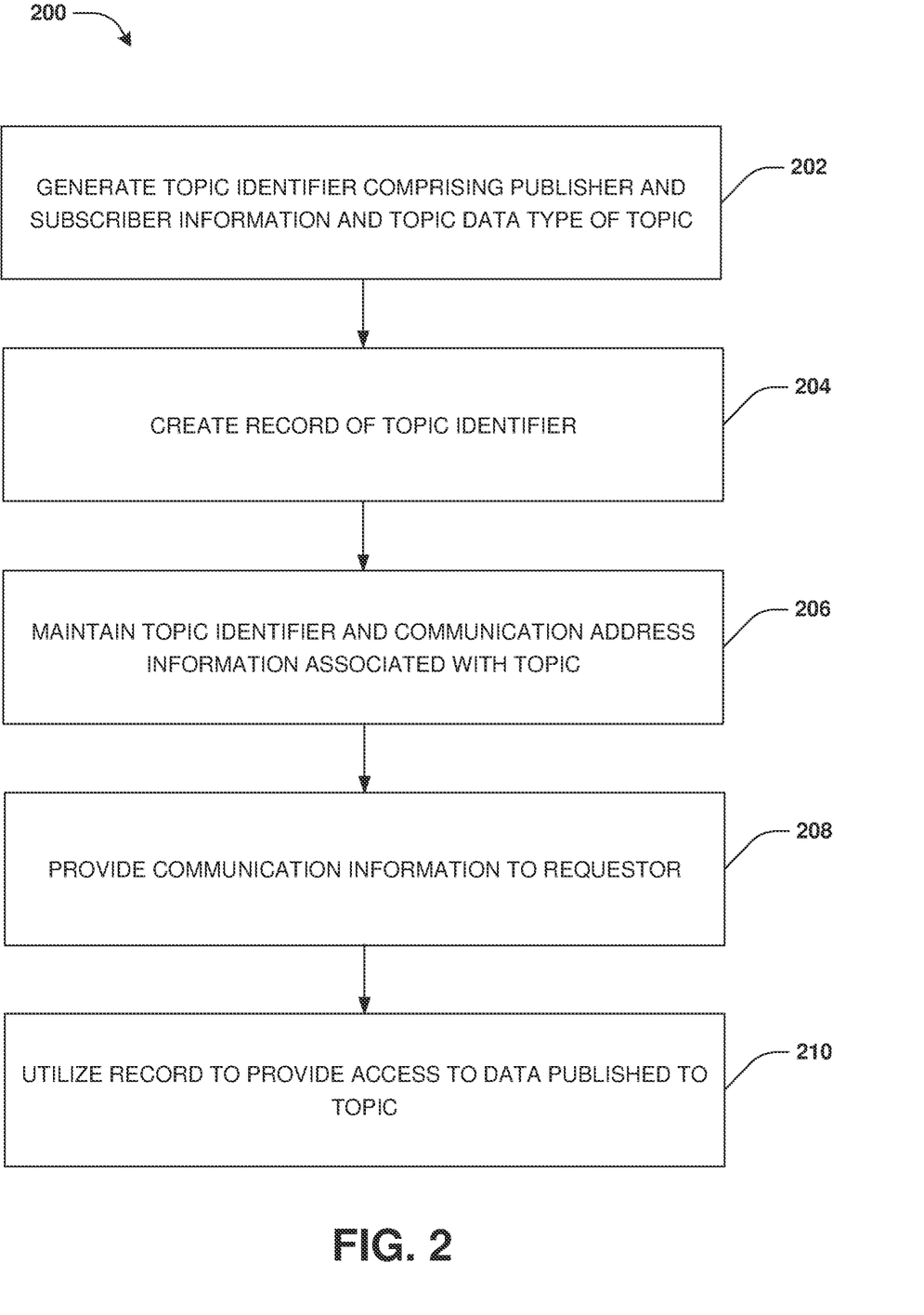
FIG. 2 is a flow chart illustrating an example method for implementing a publish and subscribe communication system.
Figure 3:
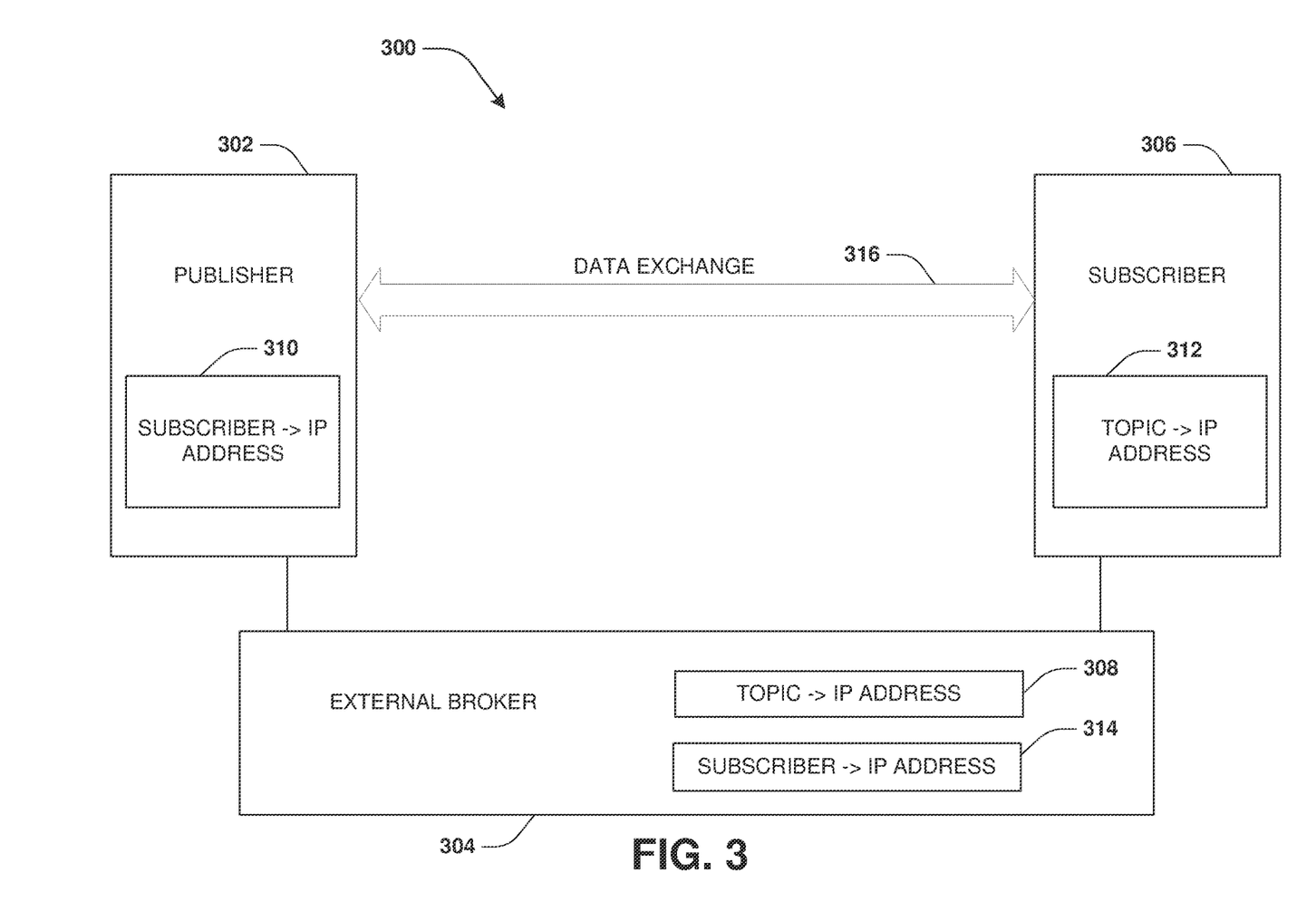
FIG. 3 is a diagram illustrating an example scenario associated with a publish and subscribe communication system.

An embodiment of implementing a publish and subscribe communication system is illustrated by an exemplary method 200 of FIG. 2, which are further described in conjunction with a publish and subscribe communication system 300 of FIG. 3. A topic creator may generate a topic where one or more publishers may publish data to the topic and one or more subscribers may subscribe to the topic, depending on the topic data type of the topic. In an embodiment, the topic may be a general subscription topic where a publisher publishes data to a plurality of subscribers. In an embodiment, the topic may be a general publish topic for a plurality of publishers to publish data to a topic with a single subscriber (that may represent a base station receiving RACH message, or multiple subscribers). In an embodiment, the topic may be a dedicated topic for a single publisher to provide data to a single subscriber using point-to-point communication. For simplicity, a single publisher 302 and a single subscriber 306 are illustrated by FIG. 3, but there may be any number of publishers and/or any number of subscribers.

As part of generating the topic, the topic creator may generate a topic identifier, during operation 202 of method 200. The topic identifier may comprise publisher and subscriber information and/or a topic data type of a topic. The publisher and subscriber information may comprise a subscriber identifier field, a publisher identifier field, a publisher type, and/or a subscriber type. The topic data type may indicate whether the topic is a general subscription topic, a general publish topic, or a dedicated topic. In some embodiments, the topic identifier may comprise a run identifier associated with an instance of a computer generated simulation of a wireless network corresponding to a plurality of services/components, such as where the publish and subscribe communication system 300 may be hosted across one or more servers used to run a simulation of a wireless communication network such as a cellular network. The run identifier may comprise a unique identifier assigned to a particular simulation being performed, such as where the simulation uses the publish and subscribe communication system 300 for communication. In some embodiments, the topic identifier comprises a queue type correspond to a queue priority for data transmission associated with the topic (e.g., a high queue priority for real time data, a middle queue priority for fast data, and a low queue priority to low priority data).

In some embodiments, the topic identifier may be unique and capture a purpose of the topic, and thus can be used for components to communicate together. The topic identifiers are also used to route traffic of topics and between components in an efficient manner. In some embodiments, routing of data between servers hosting components may be simplified by mapping a new topic into a 64 bit topic identifier. The topic identifier may be included within the first two 32-bit words (word 0 and word 1) in a packet used for communicating between components. The topic identifier may comprise a subscriber identifier. The subscriber identifier may comprise an entity identifier of a component that is to subscribe to the topic (e.g., a UE ID or a RAN ID), a lowest 16 bits of the entity identifier, or a particular value if the topic is a general subscription topic (e.g., all 1s). In some embodiments, the subscriber identifier may be stored within a first set of bits of the topic identifier (e.g., bits 0 to 15 of word 0 of the topic identifier). The topic identifier may comprise a publisher identifier. The publisher identifier may comprise an entity identifier of a component that is to publish to the topic (e.g., a UE ID or a RAN ID), a lowest 16 bits of the entity identifier, or a particular value if the topic is a general publish topic (e.g., all 1s). In some embodiments, the publisher identifier may be stored within a second set of bits of the topic identifier (e.g., bits 16 to 31 of word 0 of the topic identifier).

The topic identifier may comprise a topic data type. In some embodiments, the topic data type may comprise 8 bits (e.g., bits 0 to 7 of word 1 of the topic identifier) to describe the type of topic to which the publisher will be publishing (e.g., a general publish topic, a general subscription topic, a dedicated topic, etc.). This allows consistency of the type of data being produced and how each publisher and subscriber can expect to understand a topic. In an embodiment, a most significant bit, such as bit 7, indicates the topic type (e.g. 0 for general subscription topic or dedicated topic and 1 for general publish topic). The topic identifier may comprise a publisher type. In some embodiments, the publisher type may comprise 6 bits (e.g., bits 8 to 13 of word 1 of the topic identifier) used to identify whether the publisher is a radio access network (RAN), user equipment (UE), a clock sync module (CSM), channel verifPHYe (CHV), or other source. The topic identifier may comprise a subscriber type. In some embodiments, the subscriber type may comprise 6 bits (e.g., bits 14 to 19 of word 1 of the topic identifier) used to indicate whether the subscriber is a data unit (DU), user equipment (UE), a clock sync module (CSM), channel verifPHYe (CHV), or other source. The topic identifier may comprise a run identifier associated with a particular simulation instance of a wireless communication network being simulated. In some embodiments, the run identifier comprises 10 bits (e.g., bits 20 to 29 of word 1). The topic identifier may comprise a queue type. In some embodiments, the queue type may comprise 2 bits (e.g., bits 30 to 31 of word 1) to indicate that type of queue used for data being published to the topic (e.g., 00 for real time data, 01 for fast data, 10 for low priority data, 11 for reserved).

Once the topic identifier has been defined, a local record of the topic identifier may be created within a local topic list, during operation 204 of FIG. 2. An indication that the topic is to be created may be transmitted to an external broker 304 of the publish and subscribe communication system 300. The request may comprise the topic identifier and/or communication address information associated with the topic (e.g., an IP address associated with the topic to which the publisher is publishing). In this way, the topic identifier and communication information associated with the topic may be maintained by the external broker 304, during operation 206 of FIG. 2. For example, the topic identifier and communication information associated with the topic may be stored an entry 308, mapping the topic to the IP address of the topic, maintained by the external broker 304.

During operation 208 of FIG. 2, the external broker 304 may provide the communication address information of the topic to a requestor in response to an inquiry from the requestor regarding the topic identifier. In some embodiments, the requestor may comprise a publisher 302 that wants to publish to the topic, and thus the external broker 304 may provide the publisher 302 with the communication address information that the publisher 302 can used to publish to the topic such as a general publish topic. In some embodiments, the requestor may comprise a subscriber that wants to subscribe to the topic, such as subscriber 306. The subscriber 306 may transmit a subscription request comprising the topic identifier and/or a subscriber communication address of the subscriber 306 (e.g., an IP address of the subscriber 306) to the external broker 304. The external broker 304 may store the subscriber communication address as an entry 314 mapping a subscriber identifier of the subscriber 306 to the IP address of the subscriber 306. The external broker 304 may transmit a message, comprising the subscriber communication address and an indication that the subscriber 306 is subscribing to the topic, to the publisher 302. The publisher 302 may create an entry 310 mapping the subscriber identifier of the subscriber 306 to the IP address of the subscriber 306 based upon the message. The external broker 304 may transmit a message to the subscriber 306 based upon the entry 308. The message may comprise the topic identifier and the IP address of the topic. The subscriber 306 may create an entry 312 based upon the message to map the topic identifier to the IP address of the topic.

If a topic is local to the subscriber 306 (e.g., the topic and the subscriber 306 are hosted by a same server), then the subscriber 306 is registered with the topic through the local topic list. If the topic is external to the subscriber 306 (e.g., the topic and the subscriber 306 are hosted by different servers), then a subscriber identifier of the subscriber 306 is added to a topic name of the topic within an external topic list. If the topic is external to the subscriber 306 and is registered with the external broker 304 of the publish and subscribe communication system 300, then a request is transmitted to the publisher 302 to register the subscriber 306 with the topic. The request may comprise a subscriber communication address (e.g., IP address) and port number of the subscriber 306.

During operation 210 of method 200, access to data published to the topic is provided to subscribers of the topic, such as the subscriber 306. The publisher 302 directly transmits 316 the data to the subscribers, such as by using the entry 310 to transmit 316 the data to the subscriber 306 using the IP address of the subscriber 306. If the topic is a local topic, then the data may be locally shared with the subscriber 306 utilizing shared memory of the server hosting both the subscriber 306 and the local topic.

In some embodiments, the external broker 304 may receive an unsubscribe request from the subscriber 306. The unsubscribe request may comprise the topic identifier of the topic for which the subscriber wants to unsubscribe and/or the subscriber communication address of the subscriber 306. The external broker 304 may transmit an unsubscribe message, comprising the subscriber communication address and an unsubscribe indication that the subscriber 306 is unsubscribing to the topic, to the publisher 302. In this way, the subscriber 306 can unsubscribe from receiving data published to the topic by the publisher (e.g., and/or other publishers if the topic is a general publish topic).

In some embodiments, a topic may be deleted, such as by the publisher 302 or by the subscriber 306. Accordingly, topic information about the topic may be deleted from the external broker 304. The topic information may be deleted from a topic list of available topics. The topic information may be deleted from a subscriber list of subscribers that have subscribed to topics within the topic list.

Figure 4:
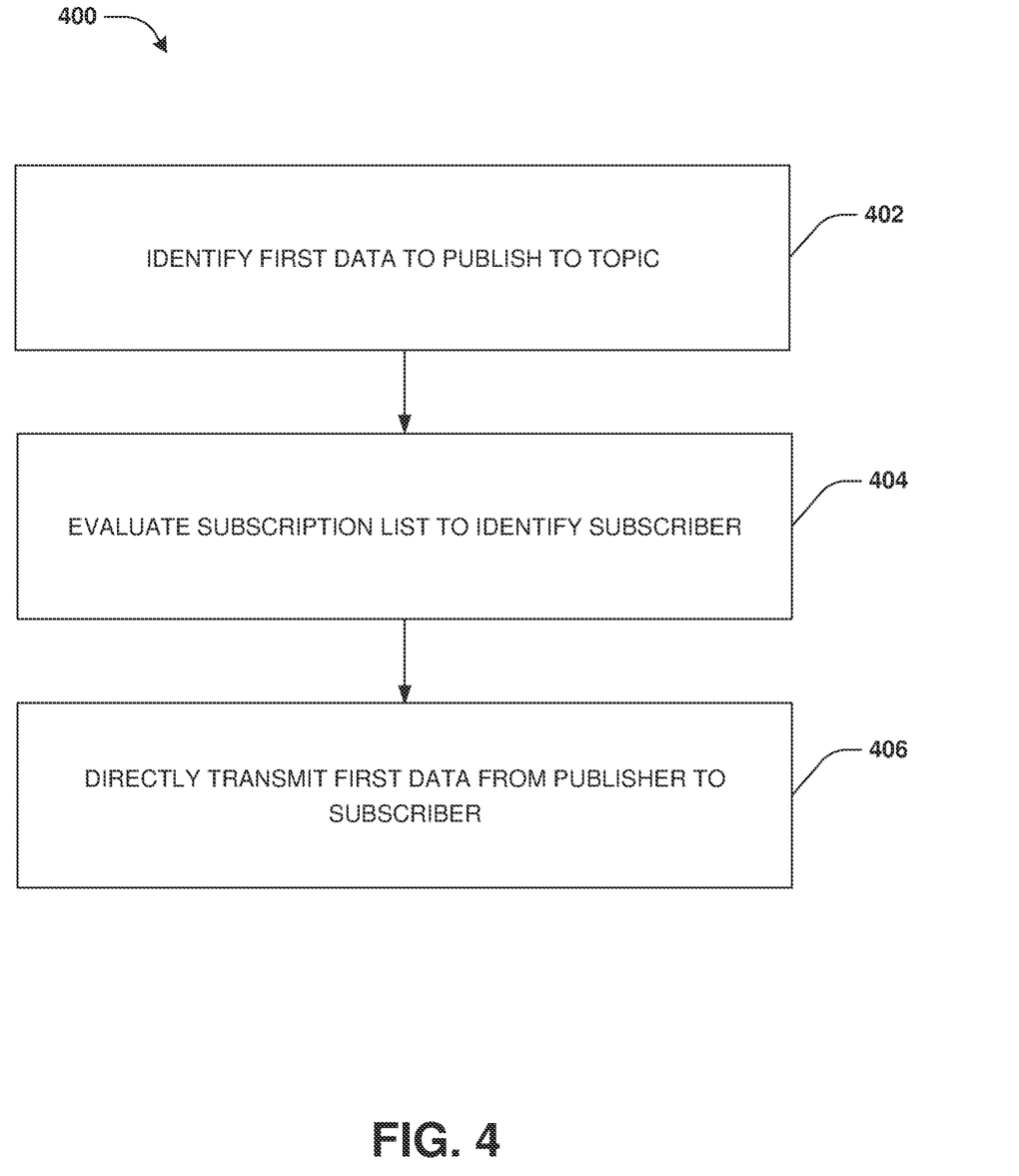
FIG. 4 is a flow chart illustrating an example method for publishing data through a publish and subscribe communication system.

An embodiment of implementing a publish and subscribe communication system is illustrated by an exemplary method 400 of FIG. 4. A topic creator may create a topic, such as a general publish topic, a general subscription topic, or a dedicated topic. One or more publishers may be associated with the topic, such as where there is a single publisher for the general subscription topic and the dedicated topic or where there can be multiple publishers for the general publish topic.

During operation 402 of FIG. 4, a publisher may identify first data to publish to the topic. During operation 404 of FIG. 4, the publisher may evaluate a local subscription list to identify one or more local subscribers of the topic. In an embodiment, a local subscriber may correspond to a subscriber hosted by the same server hosting the publisher. During operation 406 of FIG. 4, the publisher may directly transmit the first data to the one or more local subscribers of the topic utilizing subscriber communication addresses specified by the local subscription list. In some embodiments, shared memory of the server may be used to share the first data directly with the subscriber. The publisher may evaluate a remote subscription list to identify one or more remote (external) subscribers of the topic (e.g., subscribers located at a server different than the server hosting the publisher). The publisher may directly transmit packets of the first data to the one or more remote subscribers utilizing addresses of the remote subscribers, such as a communication address, an IP address, or any other type of identifier or address. In some embodiments, a queue type within a topic identifier of the topic is used to queue the packets into a particular type of queue corresponding to the queue type for transmission to the one or more remote subscribers. In this way, data may be prioritized based upon whether the data comprises real time data (e.g., a faster/higher priority queue may be used), fast data that changes greater than a first threshold frequency and less than a second threshold frequency (e.g., a medium speed/medium priority queue may be used), or low priority data that changes less than both the first threshold frequency and the second threshold frequency (e.g., a low speed/low priority queue may be used).

Figure 5A:
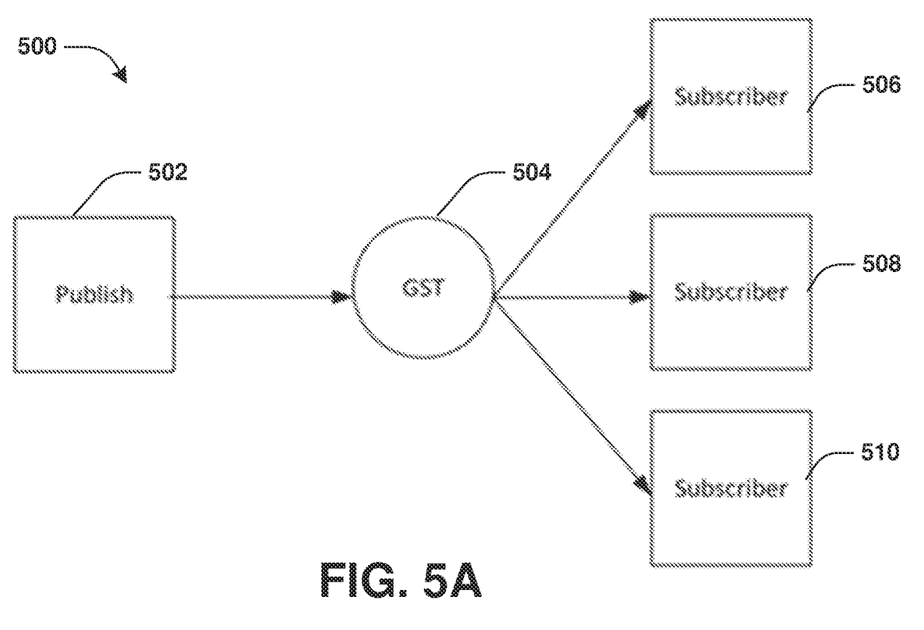
FIG. 5A is a diagram illustrating an example scenario associated with a publish and subscribe communication system implementing a general subscription topic.
Figure 5B:
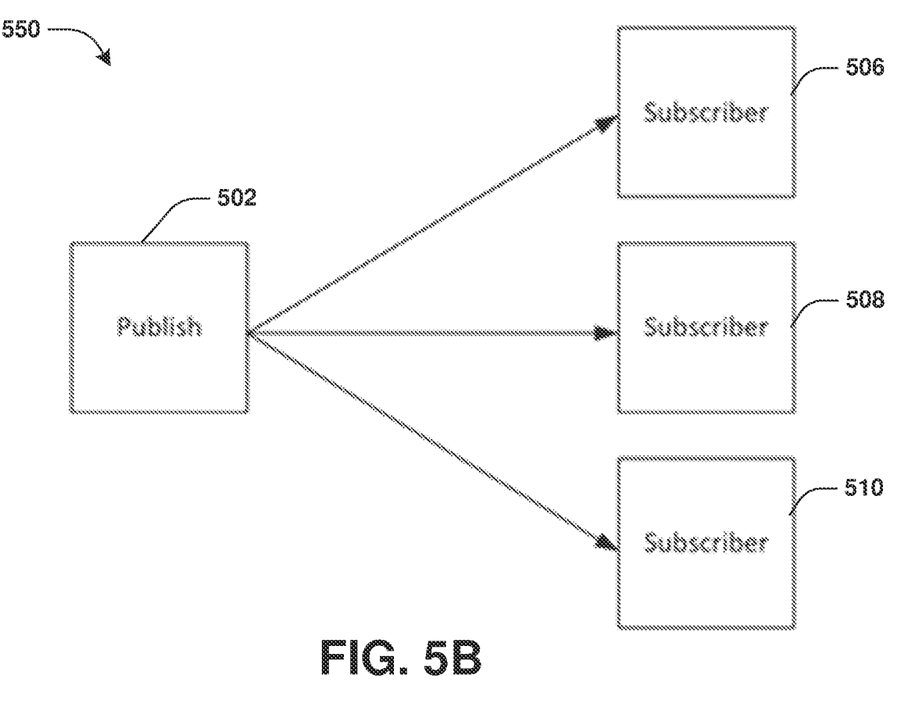
FIG. 5B is a diagram illustrating an example scenario associated with a publish and subscribe communication system implementing a general subscription topic.

FIG. 5A illustrates a logical representation 500 of a publish and subscribe communication system where a publisher 502 is associated with a general subscription topic 504. Any number of subscribers may subscribe to the general subscription topic 504, such as a subscriber 506, a subscriber 508, a subscriber 510, and/or any other subscribers. FIG. 5B illustrates a data flow representation 550 of the publisher 502 transmitting data, published to the general subscription topic 504, directly to the subscribers of the general subscription topic 504.

Figure 6A:
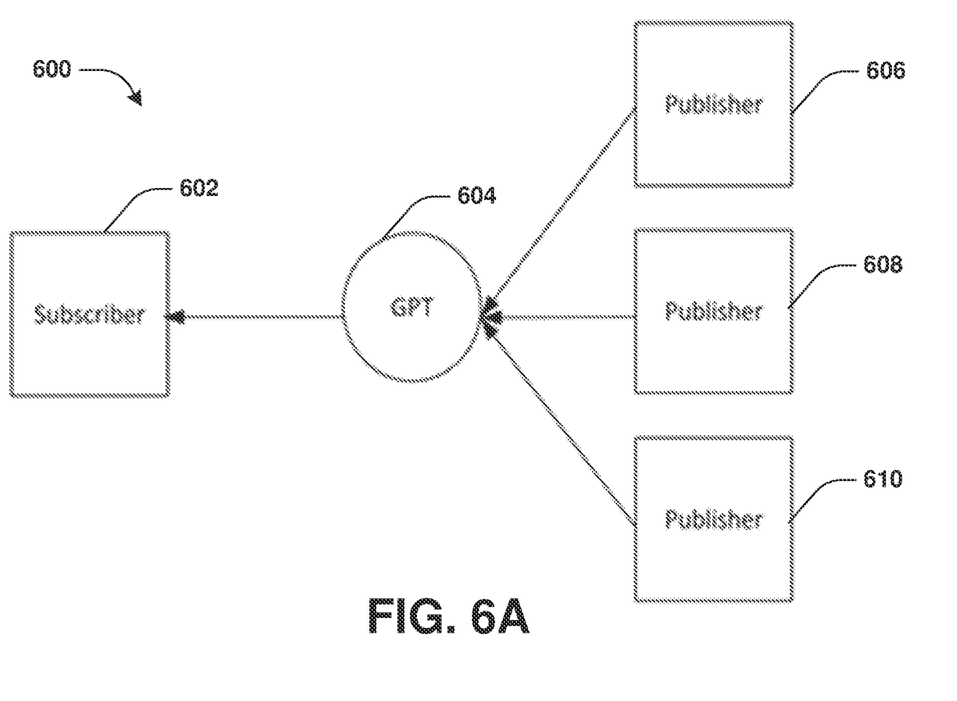
FIG. 6A is a diagram illustrating an example scenario associated with a publish and subscribe communication system implementing a general publish topic.
Figure 6B:
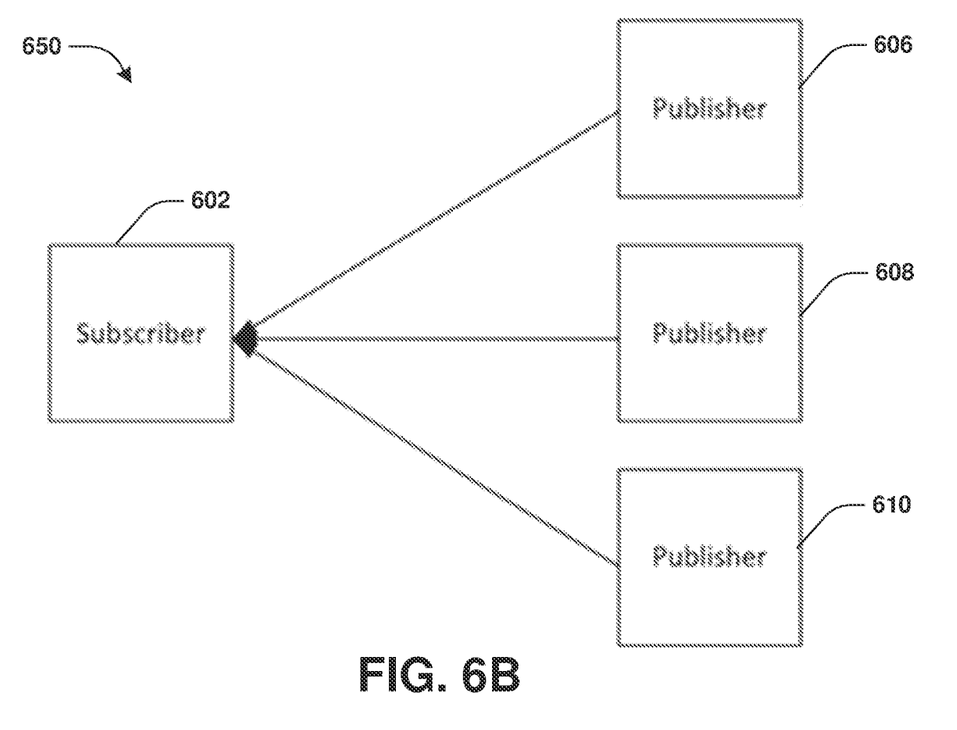
FIG. 6B is a diagram illustrating an example scenario associated with a publish and subscribe communication system implementing a general publish topic.

FIG. 6A illustrates a logical representation 600 of a publish and subscribe communication system where a subscriber 602 is associated with a general publish topic 604. Any number of publishers may join the general publish topic 604 in order to publish data of the general publish topic 604, such as a publisher 606, a publisher 608, a publisher 610, and/or any other publishers. FIG. 6B illustrates a data flow representation 650 of the publisher 606, the publisher 608, the publisher 610, and/or any other publishers that have joined the general publish topic 604 transmitting data, published to the general publish topic 604, directly to the subscriber 602 of the general publish topic 604.

According to some embodiments, a method is provided. The method includes generating a topic identifier comprising publisher and subscriber information and a topic data type of a topic; creating a local record of the topic identifier within a local topic list; maintaining, at an external broker, the topic identifier and communication address information associated with the topic; providing, by the external broker, the communication information to a requestor in response to inquiry regarding the topic identifier; and utilizing the local record to provide access to data published to the topic, wherein a publisher of the topic directly transfers data of the topic to a subscriber of the topic.

According to some embodiments, the method includes populating the topic identifier with a subscriber identifier field, a publisher identifier field, a publisher type, and a subscriber type as the publisher and subscriber information.

According to some embodiments, the method includes populating the topic identifier with a run identifier associated with an instance of a simulation of a wireless network corresponding to a plurality of services; and populating the topic identifier with a queue type corresponding to a queue priority for data transmission associated with the topic.

According to some embodiments, the method includes receiving, by the external broker from the subscriber, a subscription request comprising the topic identifier and a subscriber communication address of the subscriber; and transmitting, from the external broker to the publisher, a message comprising the subscriber communication address and an indication that the subscriber is subscribing to the topic.

According to some embodiments, the method includes directly transferring, by the publisher to the subscriber using the subscriber communication address, the data published to the topic.

According to some embodiments, the method includes receiving, by the external broker from the subscriber, a unsubscribe request comprising the topic identifier and the subscriber communication address of the subscriber; and transmitting, from the external broker to the publisher, an unsubscribe message comprising the subscriber communication address and an unsubscribe indicator that the subscriber is unsubscribing to the topic.

According to some embodiments, the method includes in response to determining that the topic is local to the subscriber, registering the subscriber with the topic through the local topic list.

According to some embodiments, the method includes in response to determining that the topic is external to the subscriber, adding a subscriber identifier of the subscriber to a topic name of the topic within an external topic list.

According to some embodiments, the method includes in response to determining that the topic is external to the subscriber and is registered with the external broker, transmitting a request to the publisher to register the subscriber with the topic, wherein the request comprises a subscriber communication address and port number of the subscriber.

According to some embodiments, a system is provided. The system comprises a processor coupled to memory, the processor configured to execute instructions to perform operations. The operations include identifying, by a publisher, first data to publish to a topic; evaluating, by the publisher, a local subscription list to identify one or more local subscribers of the topic; directly transmitting, by the publisher, the first data to the one or more local subscribers of the topic utilizing subscriber communication addresses specified by the local subscription list.

According to some embodiments, the operations include evaluating, by the publisher, a remote subscription list to identify one or more remote subscribers of the topic; and directly transmitting, by the publisher, packets of the first data to the one or more remote subscribers.

According to some embodiments, the operations include queuing the packets for direct transmission to the one or more remote subscribers, wherein the packets are queued based upon a queue type specified by a topic identifier of the topic.

According to some embodiments, the operations include joining, by the publisher, a general publish topic; and directly transmitting, by the publisher, second data to one or more subscribers associated with a communication address of the general publish topic.

According to some embodiments, the operations include prioritizing the first data based upon whether the first data comprises real-time data, fast data that changes greater than a first threshold frequency and less than a second threshold frequency, or low priority data that changes less than the first threshold frequency and the second threshold frequency.

According to some embodiments, the operations include generating the topic as a general subscription topic for the publisher to publish data to a plurality of subscribers including the one or more local subscribers.

According to some embodiments, the operations include generating the topic as a general publish topic for a plurality of publishers to publish data to a single subscriber.

According to some embodiments, the operations include generating the topic as a dedicated topic for the publisher to provide data to a single subscriber corresponding to point to point communication.

According to some embodiments, a non-transitory computer-readable medium storing instructions that when executed facilitate performance of operations, is provided. The operations include generating a topic identifier comprising publisher and subscriber information and a topic data type of a topic; maintaining, at an external broker, the topic identifier and communication address information associated with the topic; providing, by the external broker, the communication information to a requestor in response to inquiry regarding the topic identifier; and providing access to data published to the topic, wherein a publisher of the topic directly transfers data of the topic to a subscriber of the topic.

According to some embodiments, the operations include locally sharing the data utilizing shared memory.

According to some embodiments, the operations include deleting topic information about the topic from the external broker, a topic list, and a subscription list.

Figure 7:
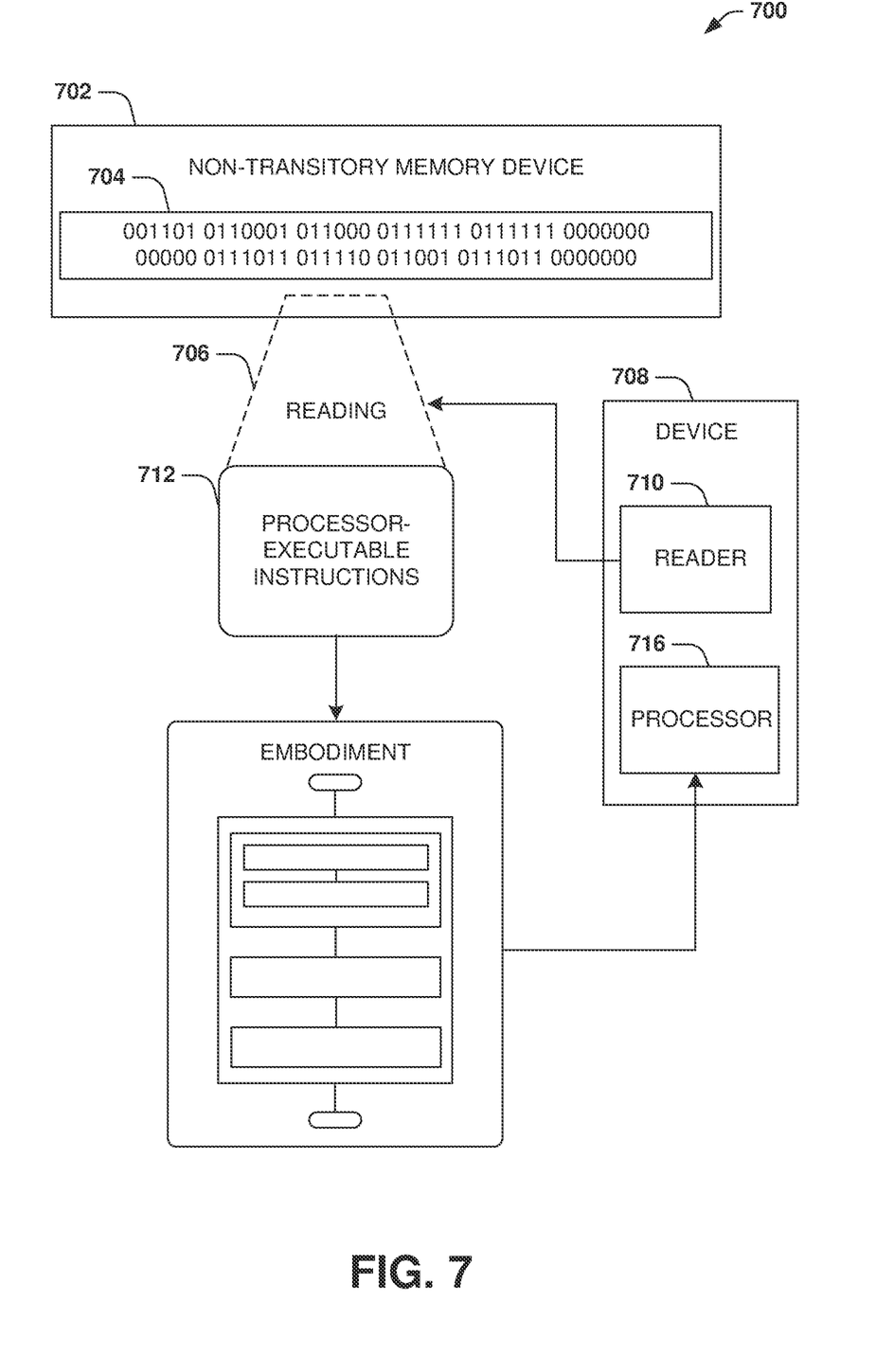
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein. The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed cause performance of operations, such as at least some of the example method 200 of FIG. 2 and/or at least some of the example method 400 of FIG. 4, for example. In some embodiments, the processor-executable instructions 712 are configured to cause implementation of a system, such as at least some of the example system 100 of FIG. 1 and/or at least some of the example system 300 of FIG. 3, for example.

Figure 8:
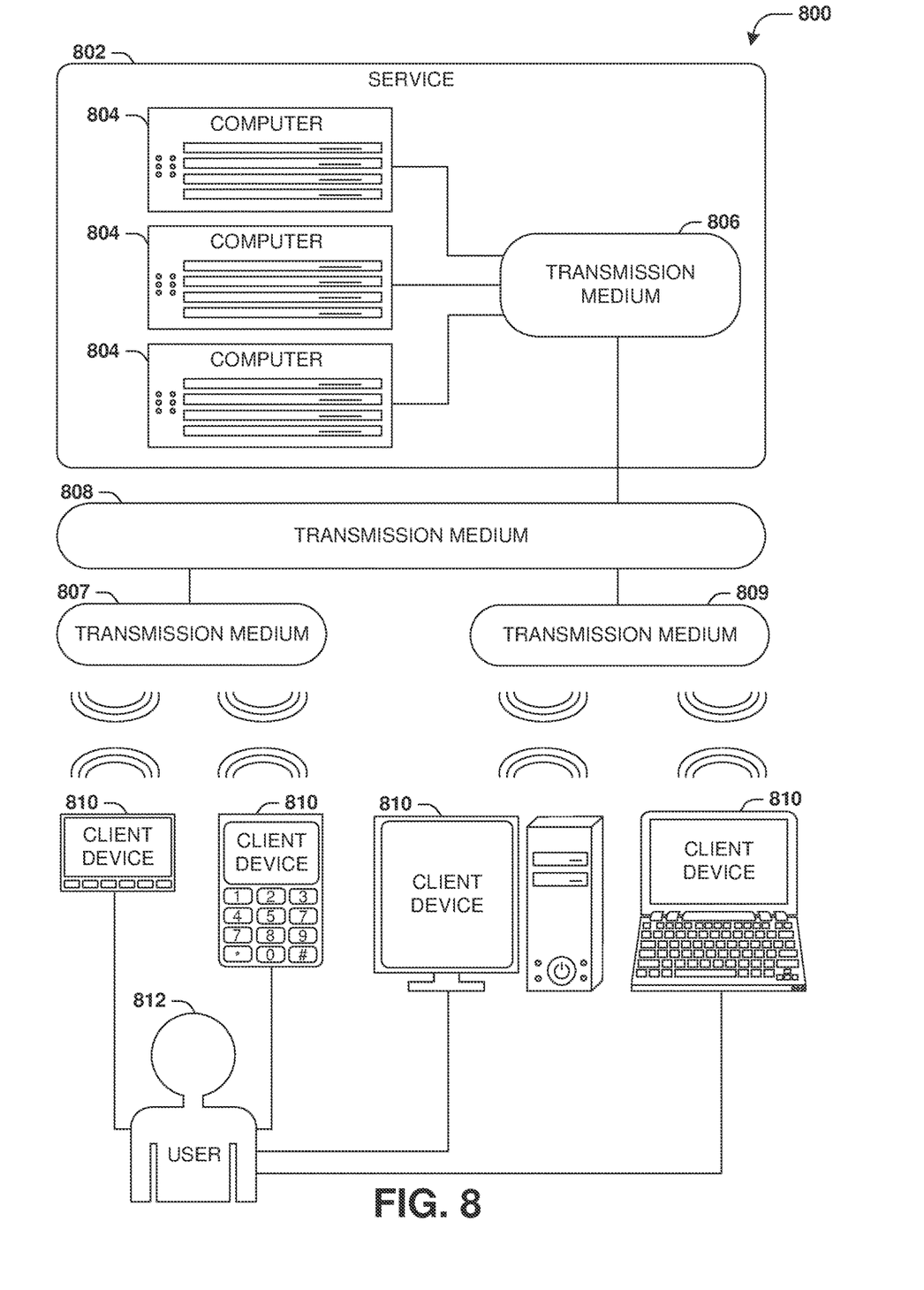
FIG. 8 is an illustration of example networks that may utilize and/or implement at least a portion of the techniques presented herein.

FIG. 8 is an interaction diagram of a scenario 800 illustrating a service 802 provided by a set of computers 804 to a set of client devices 810 via various types of transmission mediums. The computers 804 and/or client devices 810 may be capable of transmitting, receiving, processing, and/or storing many types of signals, such as in memory as physical memory states.

The computers 804 of the service 802 may be communicatively coupled together, such as for exchange of communications using a transmission medium 806. The transmission medium 806 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 802.

Likewise, the transmission medium 806 may comprise one or more sub-networks, such as may employ different architectures, may be compliant or compatible with differing protocols and/or may interoperate within the transmission medium 806. Additionally, various types of transmission medium 806 may be interconnected (e.g., a router may provide a link between otherwise separate and independent transmission medium 806).

In scenario 800 of FIG. 8, the transmission medium 806 of the service 802 is connected to a transmission medium 808 that allows the service 802 to exchange data with other services 802 and/or client devices 810. The transmission medium 808 may encompass various combinations of devices with varying levels of distribution and exposure, such as a public wide-area network and/or a private network (e.g., a virtual private network (VPN) of a distributed enterprise).

In the scenario 800 of FIG. 8, the service 802 may be accessed via the transmission medium 808 by a user 812 of one or more client devices 810, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 810 may communicate with the service 802 via various communicative couplings to the transmission medium 808. As a first such example, one or more client devices 810 may comprise a cellular communicator and may communicate with the service 802 by connecting to the transmission medium 808 via a transmission medium 807 provided by a cellular provider. As a second such example, one or more client devices 810 may communicate with the service 802 by connecting to the transmission medium 808 via a transmission medium 809 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the computers 804 and the client devices 810 may communicate over various types of transmission mediums.

Figure 9:
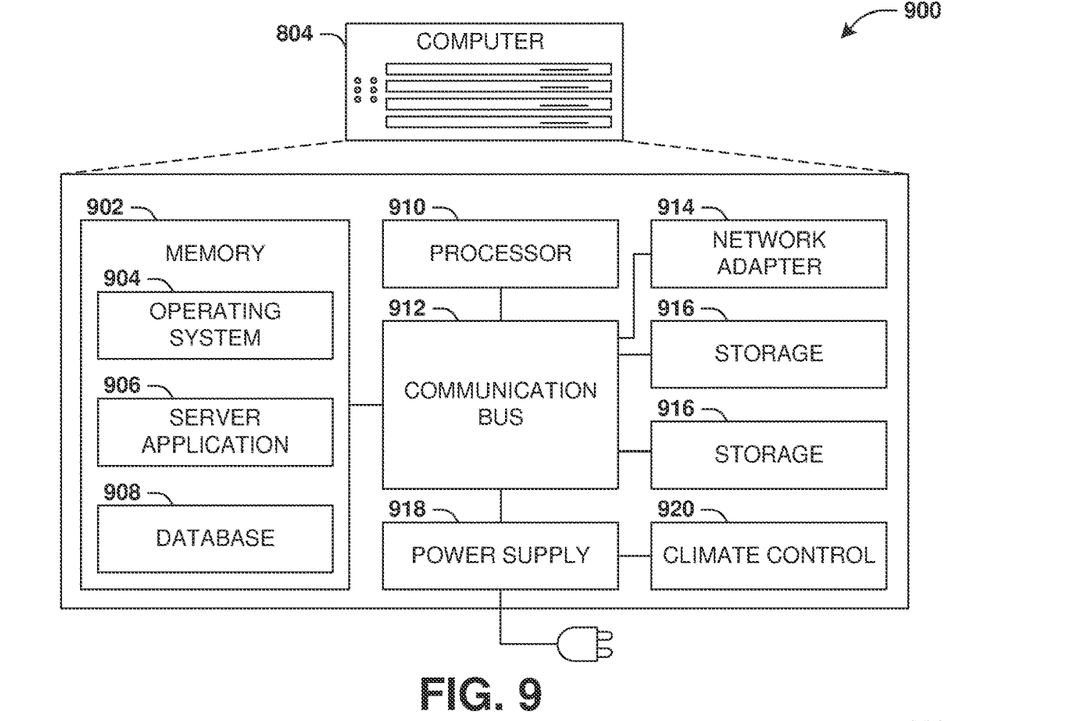
FIG. 9 is an illustration of a scenario involving an example configuration of a computer that may utilize and/or implement at least a portion of the techniques presented herein.

FIG. 9 presents a schematic architecture diagram 900 of a computer 804 that may utilize at least a portion of the techniques provided herein. Such a computer 804 may vary widely in configuration or capabilities, alone or in conjunction with other computers, in order to provide a service such as the service 802.

The computer 804 may comprise one or more processors 910 that process instructions. The one or more processors 910 may optionally include a plurality of cores; one or more coprocessors, such as a mathematics coprocessor or an integrated graphical processing unit (GPU); and/or one or more layers of local cache memory. The computer 804 may comprise memory 902 storing various forms of applications, such as an operating system 904; one or more computer applications 906; and/or various forms of data, such as a database 908 or a file system. The computer 804 may comprise a variety of peripheral components, such as a wired and/or wireless network adapter 914 connectible to a local area network and/or wide area network; one or more storage components 916, such as a hard disk drive, a solid-state storage device (SSD), a flash memory device, and/or a magnetic and/or optical disk reader.

The computer 804 may comprise a mainboard featuring one or more communication buses 912 that interconnect the processor 910, the memory 902, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 912 may interconnect the computer 804 with at least one other computer. Other components that may optionally be included with the computer 804 (though not shown in the schematic architecture diagram 900 of FIG. 9) include a display; a display adapter, such as a graphical processing unit (GPU); input peripherals, such as a keyboard and/or mouse; and a flash memory device that may store a basic input/output system (BIOS) routine that facilitates booting the computer 804 to a state of readiness.

The computer 804 may operate in various physical enclosures, such as a desktop or tower, and/or may be integrated with a display as an "all-in-one" device. The computer 804 may be mounted horizontally and/or in a cabinet or rack, and/or may simply comprise an interconnected set of components. The computer 804 may comprise a dedicated and/or shared power supply 918 that supplies and/or regulates power for the other components. The computer 804 may provide power to and/or receive power from another computer and/or other devices. The computer 804 may comprise a shared and/or dedicated climate control unit 920 that regulates climate properties, such as temperature, humidity, and/or airflow. Many such computers 804 may be configured and/or adapted to utilize at least a portion of the techniques presented herein.

Figure 10:
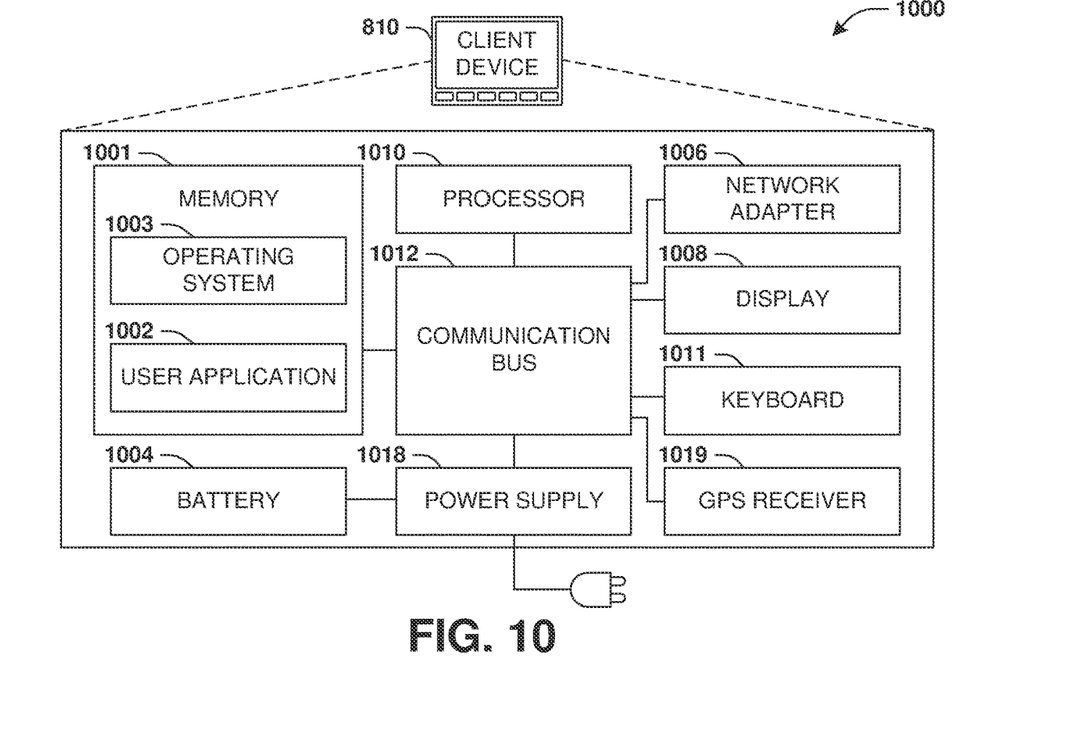
FIG. 10 is an illustration of a scenario involving an example configuration of a client that may utilize and/or implement at least a portion of the techniques presented herein.

FIG. 10 presents a schematic architecture diagram 1000 of a client device 810 whereupon at least a portion of the techniques presented herein may be implemented. Such a client device 810 may vary widely in configuration or capabilities, in order to provide a variety of functionality to a user such as the user 812. The client device 810 may be provided in a variety of form factors, such as a desktop or tower workstation; an "all-in-one" device integrated with a display 1008; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 810 may serve the user in a variety of roles, such as a workstation, kiosk, media player, gaming device, and/or appliance.

The client device 810 may comprise one or more processors 1010 that process instructions. The one or more processors 1010 may optionally include a plurality of cores; one or more coprocessors, such as a mathematics coprocessor or an integrated graphical processing unit (GPU); and/or one or more layers of local cache memory. The client device 810 may comprise memory 1001 storing various forms of applications, such as an operating system 1003; one or more user applications 1002, such as document applications, media applications, file and/or data access applications, communication applications such as web browsers and/or email clients, utilities, and/or games; and/or drivers for various peripherals. The client device 810 may comprise a variety of peripheral components, such as a wired and/or wireless network adapter 1006 connectible to a local area network and/or wide area network; one or more output components, such as a display 1008 coupled with a display adapter (optionally including a graphical processing unit (GPU)), a sound adapter coupled with a speaker, and/or a printer; input devices for receiving input from the user, such as a keyboard 1011, a mouse, a microphone, a camera, and/or a touch-sensitive component of the display 1008; and/or environmental sensors, such as a global positioning system (GPS) receiver 1019 that detects the location, velocity, and/or acceleration of the client device 810, a compass, accelerometer, and/or gyroscope that detects a physical orientation of the client device 810. Other components that may optionally be included with the client device 810 (though not shown in the schematic architecture diagram 1000 of FIG. 10) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 810 to a state of readiness; and a climate control unit that regulates climate properties, such as temperature, humidity, and airflow.

The client device 810 may comprise a mainboard featuring one or more communication buses 1012 that interconnect the processor 1010, the memory 1001, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 810 may comprise a dedicated and/or shared power supply 1018 that supplies and/or regulates power for other components, and/or a battery 1004 that stores power for use while the client device 810 is not connected to a power source via the power supply 1018. The client device 810 may provide power to and/or receive power from other client devices.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   generating a topic identifier comprising publisher and subscriber information and a topic data type of a topic;
   creating a local record of the topic identifier within a local topic list;
   maintaining, at an external broker, the topic identifier and communication address information of the topic;
   providing, by the external broker, the communication address information of the topic to a requestor in response to inquiry regarding the topic identifier; and
   utilizing the local record to provide access to data published to the topic, wherein a publisher of the topic directly transfers data of the topic to a subscriber of the topic.

2. The method of claim 1, wherein the generating the topic identifier comprises:
   populating the topic identifier with a subscriber identifier field, a publisher identifier field, a publisher type, and a subscriber type as the publisher and subscriber information.

3. The method of claim 1, wherein the generating the topic identifier comprises:
populating the topic identifier with a run identifier associated with an instance of a simulation of a wireless network corresponding to a plurality of services; and
populating the topic identifier with a queue type corresponding to a queue priority for data transmission associated with the topic.

4. The method of claim 1, comprising:
receiving, by the external broker from the subscriber, a subscription request comprising the topic identifier and a subscriber communication address of the subscriber; and
transmitting, from the external broker to the publisher, a message comprising the subscriber communication address and an indication that the subscriber is subscribing to the topic.

5. The method of claim 4, comprising:
directly transferring, by the publisher to the subscriber using the subscriber communication address, the data published to the topic.

6. The method of claim 4, comprising:
receiving, by the external broker from the subscriber, a unsubscribe request comprising the topic identifier and the subscriber communication address of the subscriber; and
transmitting, from the external broker to the publisher, an unsubscribe message comprising the subscriber communication address and an unsubscribe indicator that the subscriber is unsubscribing to the topic.

7. The method of claim 1, comprising:
in response to determining that the topic is local to the subscriber, registering the subscriber with the topic through the local topic list.

8. The method of claim 1, comprising:
in response to determining that the topic is external to the subscriber, adding a subscriber identifier of the subscriber to a topic name of the topic within an external topic list.

9. The method of claim 1, comprising:
in response to determining that the topic is external to the subscriber and is registered with the external broker, transmitting a request to the publisher to register the subscriber with the topic, wherein the request comprises a subscriber communication address and port number of the subscriber.

10. A system comprising:
a memory comprising instructions; and
a processor coupled to the memory, the processor configured to execute the instructions to facilitate performance of operations comprising:
identifying, by a publisher, first data to publish to a topic;
evaluating, by the publisher, a local subscription list to identify one or more local subscribers of the topic;
directly transmitting, by the publisher, the first data to the one or more local subscribers of the topic utilizing subscriber communication addresses specified by the local subscription list;
receiving, by the publisher, communication address information of a second topic; and
publishing, by the publisher, to the second topic using the communication address information.

11. The system of claim 10, wherein the operations comprise:

evaluating, by the publisher, a remote subscription list to identify one or more remote subscribers of the topic; and
directly transmitting, by the publisher, packets of the first data to the one or more remote subscribers.

12. The system of claim 11, wherein the operations comprise:
queuing the packets for direct transmission to the one or more remote subscribers, wherein the packets are queued based upon a queue type specified by a topic identifier of the topic.

13. The system of claim 10, wherein the operations comprise:
joining, by the publisher, a general publish topic; and
directly transmitting, by the publisher, second data to one or more subscribers associated with a communication address of the general publish topic.

14. The system of claim 10, wherein the operations comprise:
prioritizing the first data based upon whether the first data comprises real-time data, fast data that changes greater than a first threshold frequency and less than a second threshold frequency, or low priority data that changes less than the first threshold frequency and the second threshold frequency.

15. The system of claim 10, wherein the operations comprise:
generating the topic as a general subscription topic for the publisher to publish data to a plurality of subscribers including the one or more local subscribers.

16. The system of claim 10, wherein the operations comprise:
generating the topic as a general publish topic for a plurality of publishers to publish data to a single subscriber.

17. The system of claim 10, wherein the operations comprise:
generating the topic as a dedicated topic for the publisher to provide data to a single subscriber corresponding to point to point communication.

18. A non-transitory computer-readable medium storing instructions that when executed facilitate performance of operations comprising:
generating a topic identifier comprising publisher and subscriber information and a topic data type of a topic;
maintaining, at an external broker, the topic identifier and communication address information associated with the topic;
providing, by the external broker, the communication address information to a requestor in response to inquiry regarding the topic identifier;
providing access to data published to the topic, wherein a publisher of the topic directly transfers data of the topic to a subscriber of the topic;
receiving, by the external broker from the subscriber, a unsubscribe request comprising the topic identifier and a subscriber communication address of the subscriber; and
transmitting, from the external broker to the publisher, an unsubscribe message comprising the subscriber communication address and an unsubscribe indicator that the subscriber is unsubscribing to the topic.

19. The non-transitory computer-readable medium of claim 18, wherein the operations comprising:
locally sharing the data utilizing shared memory.

20. The non-transitory computer-readable medium of claim 18, wherein the operations comprising:

deleting topic information about the topic from the external broker, a topic list, and a subscription list.

\* \* \* \* \*